United States Patent
Gomez Lopez et al.

(10) Patent No.: US 12,046,018 B2
(45) Date of Patent: Jul. 23, 2024

(54) METHOD FOR IDENTIFYING BONE IMAGES

(71) Applicant: UNIVERSIDAD DE GRANADA, Granada (ES)

(72) Inventors: Oscar David Gomez Lopez, Granada (ES); Oscar Ibanez Panizo, Granada (ES); Pablo Mesejo Santiago, Granada (ES); Oscar Cordón García, Granada (ES); Sergio Damas Arroyo, Granada (ES); Andrea Valsecchi, Granada (ES)

(73) Assignee: UNIVERSIDAD DE GRANADA, Granada (ES)

( * ) Notice: Subject to any disclaimer, the term of this patent is extended or adjusted under 35 U.S.C. 154(b) by 454 days.

(21) Appl. No.: 17/418,878

(22) PCT Filed: Dec. 26, 2019

(86) PCT No.: PCT/ES2019/070887
§ 371 (c)(1),
(2) Date: Jun. 28, 2021

(87) PCT Pub. No.: WO2020/136303
PCT Pub. Date: Jul. 2, 2020

(65) Prior Publication Data
US 2022/0076421 A1    Mar. 10, 2022

(30) Foreign Application Priority Data
Dec. 29, 2018  (ES) .................. 201831303

(51) Int. Cl.
*G06T 7/00* (2017.01)
*G06N 3/02* (2006.01)
(Continued)

(52) U.S. Cl.
CPC .............. *G06V 10/75* (2022.01); *G06N 3/02* (2013.01); *G06T 7/0016* (2013.01); *G06T 7/11* (2017.01);
(Continued)

(58) Field of Classification Search
CPC ...................................... A61B 34/10
See application file for complete search history.

(56) References Cited

U.S. PATENT DOCUMENTS

2018/0202904 A1* 7/2018 Gradinaru ............... G01N 1/36
2018/0330501 A1* 11/2018 Muraoka ............. A61B 6/5217
(Continued)

FOREIGN PATENT DOCUMENTS

| EP | 2461271 A2 | | 6/2012 |
| JP | 2012084114 | * | 4/2012 |
| WO | 2020136303 A1 | | 7/2020 |

OTHER PUBLICATIONS

Carmen Campomanes-Alvarez, Experimental Study of Different Aggregation Functions for Modeling Craniofacial Correspondence in Craniofacial Superimposition (Jul. 29, 2016).*

(Continued)

*Primary Examiner* — Di Xiao
(74) *Attorney, Agent, or Firm* — Kutak Rock LLP (57) ABSTRACT

The present invention has as its objective a procedure for assisting a forensic expert in making decisions in order to identify subjects by comparing images of rigid anatomical structures. This procedure includes a decision-making stage based on a hierarchical analysis model that, in particular realizations, is complemented by a previous stage of segmentation of osseous images and their superimposition.

19 Claims, 5 Drawing Sheets

(51) Int. Cl.
  *G06T 7/11*   (2017.01)
  *G06V 10/44*  (2022.01)
  *G06V 10/74*  (2022.01)
  *G06V 10/75*  (2022.01)

(52) U.S. Cl.
  CPC ............ *G06V 10/44* (2022.01); *G06V 10/761* (2022.01); *G06T 2207/20036* (2013.01); *G06T 2207/20081* (2013.01); *G06T 2207/20084* (2013.01); *G06T 2207/30008* (2013.01)

(56) References Cited

U.S. PATENT DOCUMENTS

| | | | | |
|---|---|---|---|---|
| 2019/0236782 | A1* | 8/2019 | Amit | G06T 7/0016 |
| 2020/0020097 | A1* | 1/2020 | Do | G06F 18/2413 |
| 2020/0125823 | A1* | 4/2020 | Lo | G06V 10/774 |
| 2021/0256254 | A1* | 8/2021 | Takahashi | G06F 18/22 |

OTHER PUBLICATIONS

International Search Report and Written Opinion for PCT/ES2019/070887, mailed May 26, 2020.

Campomanes-Alvarez Carmen, et al; Hierarchical information fusion for decision making in craniofacial superimposition; Information Fusion, Elsevier, US, vol. 39, Mar. 28, 2017, pp. 25-40.

Pfaeffli, et al; "Post-Mortem radiological CT identification based on classical ante-mortem X-Ray examinations"; Forensic Science International, Elsevier B.V., Amsterdam, NL, vol. 171, No. 2-3; Aug. 8, 2007, pp. 111-117.

Abdel Aziz Taha, et al.,"Metrics for evaluating 3D medical image segmentation: analysis, selection, and tool"; BMC Medical Imaging, Biomed Central, London, GB, vol. 15, No. 1, Aug. 12, 2015; p. 29.

* cited by examiner

METHOD FOR IDENTIFYING BONE IMAGES

This is the United States National Stage of Patent Cooperation Treaty Application No. PCT/EP2019/070887 filed Dec. 26, 2019, which claims priority to Spanish Patent Application No. P201831303, filed on Dec. 29, 2018, the disclosures of which are incorporated herein by reference in their entireties.

FIELD OF THE TECHNIQUE

The present invention is located in the fields of forensic identification and artificial intelligence, and more specifically in the fields of machine learning, artificial vision, and decision support systems.

The present invention is applied to the identification of human beings when at least one image of some of its rigid anatomical structures (RAS) is available. In particular, the invention can be framed within skeleton-based forensic identification techniques, and deals with human identification from digital images of bones and air cavities obtained by means of radiographs, computed tomography (CT), magnetic resonance imaging (MRI), or other modality of radiological imaging or 3D scanning.

STATE OF THE TECHNIQUE

Forensic Identification

Human identification is of the utmost importance in our society. It is not only useful when it comes to resolving serious legal and social dilemmas, but it also helps provide a solution to families, afflicted by some loss or disappearance, who need to end their distress. During the last two decades, techniques such as DNA or fingerprints have been used in numerous identification scenarios. However, the application of these methods fails when, in a specific identification scenario, there is not enough ante-mortem (AM) or post-mortem (PM) information, due to the lack of data (a second DNA sample) or by the state of conservation of the corpse. While the skeleton generally survives both natural and unnatural decomposition processes (fires, salt, water, etc.), soft tissues gradually degrade and get lost, as is often the case with massive disaster victim identification scenarios (DVI).

Skeletal forensic identification (SFI) techniques used by forensic anthropologists, dentists and pathologists are crucial in the collection of AM data and biological profiles, and even more importantly, they represent the latest opportunity for the identification of the victim using techniques such as comparative radiography, including dental comparison, or craniofacial superimposition (CFS).

According to the guidelines of the Scientific Working Group for Forensic Anthropology (SWGANTH), two levels can be distinguished within the SFI methods: 1) SFI methods for positive identification, where the comparison of radiographs and the identification of surgical implants are located; 2) secondary methods that are used for filtering tasks in the identification (i.e., discard possible candidates), where the most representative examples are the biological profile and the CFS.

Comparative Radiography

Although the present invention could be used with any type of medical image modality, radiographs and CT scans represent, due to their characteristics, the most suitable modalities for forensic identification tasks and, therefore, they are more widespread. The comparative radiography (CR) implies the comparison of two X-Ray photographs to identify whether both correspond to the same subject. In DVI scenarios, it traditionally involves comparing AM radiographs, usually performed for clinical reasons, with PM radiographs, taken trying to simulate AM radiographs in orientation and projection. Next, forensic experts make a point-by-point comparison, looking for consistencies and inconsistencies in: skeletal structure morphology, trabecular patterns, skeletal abnormalities, dental characteristics, and pathological conditions, among others. However, despite being the most used and useful method in SFI, its application is still based on a manual comparison of AM-PM data through a tedious and error-prone visual inspection process. This process entirely depends on the skills and experience of the human expert. As a consequence, its utility is reduced due to the time required for its application, as well as the errors related to the fatigue of the analyst. Meanwhile, a huge number of citizens remain unidentified since the human and technological means are insufficient to properly analyze and compare the AM and PM data. In addition, in recent years there has been a change in the courts of justice in order to use progressively more objective and reproducible approaches: from the analysis of evidence based on the experience and judgment of an expert to a more objective judicial evaluation, independent of the reliability of a specific expert or a particular methodology [Bowers C M (2001). *Jurisprudence issues in forensic odontology*. Dent Clin North Am 45: 399-415].

Despite the proven validity of CR techniques for identification purposes (using different skeletal structures, such as the frontal sinuses of the skull [Christensen A M (2005). *Testing the reliability of frontal sinuses in positive identification*. J Forensic Sci 50 (1): 18-22], the clavicle [Stephan C N, Amidan B, Trease H, Guyomarch P, Pulsipher T, Byrd J E (2014). *Morphometric Comparison of Clavicle Outlines from 3D Bone Scans and 2D Chest Radiographs: A Shortlisting Tool to Assist Radiographic Identification of Human Skeletons*. J Forensic Sci 59 (2): 306-13], teeth [Flint D J, Dove S B, Brumit P C, White M, Senn D R (2009). *Computer-aided Dental Identification: An Objective Method for Assessment of Radiographic Image Similarity*. J Forensic Sci 54 (1): 177-84], or vertebral characteristics [Kahana T, Goldin L, Hiss J (2002). *Personal Identification Based on Radiographic Vertebral Features*. The Am J Forensic Med and Pathol 23 (1): 36-41], among others), automatic and objective approaches are still in their beginnings in this field.

From the point of view of the use of computer vision techniques, there are only a few approaches that use them for skeletal structure comparison in radiographs (therefore, employing 2D images). Specifically, they use geometric morphometrics techniques (Fourier elliptical analysis) for the automatic and impartial comparison of frontal sinuses [Christensen A M (2005). *Testing the reliability of frontal sinuses in positive identification*. J Forensic Sci 50 (1): 18-22], cranial vault [Maxwell A B, Ross A H (2014). *A Radiographic Study on the Utility of Cranial Vault Outlines for Positive Identifications*. J Forensic Sci 59 (2): 314-318], clavicles [Stephan C N, Amidan B, Trease H, Guyomarch P, Pulsipher T, Byrd J E (2014). *Morphometric Comparison of Clavicle Outlines from 3D Bone Scans and 2D Chest Radiographs: A Shortlisting Tool to Assist Radiographic Identification of Human Skeletons*. J Forensic Sci 59 (2): 306-13] and patella [Niespodziewanski E, Stephan C N, Guyomarc'h P, Fenton T W (2016). *Human Identification via Lateral Patella Radiographs: A Validation Study*. Journal of Forensic Sciences 61 (1): 134-140], to give four examples. On the one hand, the first two references follow the traditional subjective and error-prone approach to CR, that requires the acquisition of PM radiographs under the same conditions as AM radiographs. On the other hand, the last two references are based on the acquisition of 3D clavicle models, but the final comparison still implies a set of 2D images obtained through a series of predefined rotations of the 3D model (unlike [Gómez O, Ibanez O, Valsecchi A, Cordón O, Kahana T (2018). *3D-2D Silhouette-based Image Registration for Comparative Radiography-based Forensic Identification*. Pattern Recognition 83: 469-480] that performs the estimation with 7 degrees of freedom without limiting itself to a predefined set of possible solutions). It is important to note that all the aforementioned approaches require the manual segmentation of the skeletal structure (frontal sinus, patella and clavicle) to obtain the Fourier descriptors. In the line of using 3D PM models of skeletal structures, in [Pfaeffli M, Vock P, Dirnhofer R, Braun M, Bolliger S A, Thali M (2007). *Postmortem radiological CT identification based on classical ante-mortem X-ray examinations*. Forensic Sci Int 171 (2-3): 111-7], the authors obtain the 3D reconstruction image of the pelvic surface and a skull from a CT scan. Through the use of virtual X-rays, and the virtual integration of the information of the section in the direction of the angle to be imitated, the workstation ("RaySum" software tool) produces an image that turns out to be the 2D projection of the original 3D volume. In this way, they replicate the manual process usually followed in CR, avoiding the acquisition of radiographs until an adequate projection (the same from the AM radiograph) is obtained.

The most widely used and discriminatory technique is dental identification. Such identification process can begin with the search in a database of an AM dentition compatible with a given PM dentition (the most frequent situation in DVI scenarios) [Plass Data DVI system, http://www.plassdata.com/news_/why_dvi_system-international.html], but it always implies a final CR stage. Although great research efforts have been made in the last decade in the automation of dental identification based on 2D radiographs, it is still an open problem. The most common procedure involves the following steps: image segmentation, feature extraction, atlas registration, and pairing. The most representative example of this procedure is the Automatic Dental Identification System (ADIS) [ADIS: Automated Dental Identification System, http://www.csee.wvu.edu/adis/index.html] which aims to automatically compare a given PM dental X-ray image with a database of AM X-ray images to find a reduced list of candidates with identical or similar dental characteristics to the subject's. Somehow similar, Flint et al. [Flint D J, Dove S B, Brumit P C, White M, Senn D R (2009). *Computer-aided Dental Identification: An Objective Method for Assessment of Radiographic Image Similarity*. J Forensic Sci 54 (1): 177-84] addressed the comparison of dental radiographs as an image registration problem. The images were recorded using four corresponding reference points on AM and PM radiographs. Both the ADIS and the Flint approach are representative examples of a broader set of dental identification systems limited by the use of 2D images (where each represents a particular projection of part of a 3D object, the dentition). Among the limitations of these methods, one could mention its inability to correctly align the AM and PM radiographs if they do not contain the same number of teeth, or the fact that most of these 2D techniques have been developed and validated only with interproximal radiographs (also called bitewing radiographs).

Recently, a more advanced ADIS approach to dental biometrics has been proposed: Zhong et al. [Zhong X, Yu D, Wonga Y S, Sim T, Lu W F, Foong K W C, Cheng H L (2013). *3D dental biometrics: Alignment and matching of dental casts for human identification*. Comput Ind 64: 1355-70] developed algorithms for automatic segmentation, feature extraction, and 3D registration of dentition models. However, the usefulness of this approach in the field of dental identification is limited due to the need for AM dental molds. In addition, existing SFI computerized approaches do not model human reasoning in the presence of partial and uncertain knowledge. This is the case of automatic dental identification systems, such as the aforementioned Flint and Zhong, when the dentition AM differs from the PM (new restorations, lost, damaged or broken teeth). There are no previous works that address in a computerized way the comparison of articulated bone structures, such as the spinal column.

As is evident, in the processes of human identification we try to apply the entire spectrum of forensic knowledge to all the available human remains. The closest approach to this holistic approach to identification is the Plass Data DVI system, http://www.plassdata.com/news/why-dvi-system-.html. Plass Data has structured databases of AM and PM data allowing to perform search operations over them. However, there is not a single proposal in the scientific literature or a commercial product that approaches the real-world SFI procedure that consists in analyzing the complete skeleton and looking for consistencies and inconsistencies with all available AM data. They only focus on a particular identification method and, consequently, do not face the problem of combining the results of different methods taking into account their accuracy, the quality of the AM material and the state of the skeletal structure being examined.

For all these reasons, and despite the advances made in this field, it is necessary to have automated and reproducible CR procedures that allow:

avoid subjectivity and lack of reproducibility in human identification procedures;

automatically add information from different superimpositions, using both the same type of bone or cavity or different ones, giving a different weight to each type depending on its reliability in forensic studies;

allow large comparisons to be made in an identification scenario, so that a PM case can be compared against a large "library" of AM images, and obtain the most "similar" examples, thus reducing the number of comparisons that have to be made by the human expert.

BRIEF DESCRIPTION OF THE INVENTION

The present invention provides a method that allows obtaining useful information to determine if two or more osseous images correspond to the same subject. It uses artificial intelligence and computer vision techniques to allow reducing costs and identification time in the field of SFI, providing a greater reliability and objectivity than known methods. The main application of the invention is to support decision making in forensic identification.

Thus, the first object of the invention is an identification procedure based on the automatic comparison of two or more osseous images. In particular, images obtained in two different temporal instants such as PM and AM, useful for forensic identification. A particular case of this invention is its application to the CR technique, described above, when the AM image is an X-ray image. In their preferred realization, at least one of the two osseous images, the one that was obtained at a later time, will be a three-dimensional osseous image. Even more preferably, the two osseous images will be three-dimensional, since this implies having more information.

A second object of the invention relates to computer programs that implement the method of the first object of the invention.

A third object of the invention relates to the system that is capable of carrying out the process of the first object of the invention.

The present invention overcomes many of the limitations in the known state of the art:

First, it allows automating and integrating a whole series of operations (image segmentation and registration), necessary for the identification by comparison of osseous images and which, so far, have been performed manually and independently.

Secondly, the method comprises a stage of support to the decision-making that allows adding all existing information (such as the quality of one or more superimpositions, the quality of the images, and the visibility of the skeletal structures in them) to facilitate the final decision of the forensic expert.

Third, in the specific case of CR, and where an AM 2D image and a 3D PM image are used, the need to manually perform a PM radiograph that emulates the pose and perspective of the AM radiograph is eliminated. The need to make the comparison only with a reduced set of 2D projections obtained through the rotation, with predetermined angles, of the 3D model is also eliminated. In a particular realization, the present method can automatically segment the skeletal structure of the 2D image or 3D volume, and then automatically search for the projective transformation that, applied to the 3D model, generates the most similar projection onto the AM radiograph. It is crucial to remember that, with the proposed invention, it is possible to automatically carry out both the pre-processing of the AM and PM images (image segmentation) and the superimposition, so it does not require any type of human expert intervention.

Finally, the method also allows comparisons of different bones or cavities (anatomical structures) in a single system, allowing the aggregation of the information of each one of them to assist the forensic expert more adequately in the final identification decision.

BRIEF DESCRIPTION OF THE FIGURES

The following is a brief description of each of the figures used to complete the description of the invention through two preferred, non-limiting, realizations.

FIG. 1.—Flowchart of a preferred implementation of the forensic identification scenario with three stages. The input data is composed of two images, AM and PM, which may have the same dimensionality (2D-2D or 3D-3D) or different dimensionality (2D-3D or 3D-2D). These images are superimposed via their segmentation (stage 1) and the search of their best superimposition (stage 2). The two stages are carried out automatically without any kind of intermediation by human experts. Each pair of AM and PM images is automatically superimposed and every superimposition is quantified using one or multiple superimpositions metrics. These metrics are the input to the decision-making support system (stage 3). The output of this final stage is a report of the degree of confidence for positive identification or exclusion.

FIG. 2.—Scheme of the deep learning-based system for image segmentation. Stage 1 involves the automatic segmentation of skeletal structures in AM and PM images. The preferred implementation is based on deep convolutional neural networks. Deep convolutional neural networks are capable of segmenting clavicles in chest radiographs with accuracy equal to or greater than the one offered by a human expert. In the left of the figure, a chest radiograph is shown, i.e., the input of the network. In the middle of the figure, the convolutional blocks that compose the neural network are shown. In the right of the figure, the segmentation of the clavicle is shown in yellow, i.e., the output of the network.

DETAILED EXPLANATION OF THE INVENTION

Definitions

The term "osseous image" includes both two-dimensional (such as an X-ray) and three-dimensional (such as CT, MRI, or 3D scanning of the surface of the RAS, which excludes air cavities, obtained by laser, photogrammetry, structured light, etc.). Preferably, the rigid anatomical structure will be a bone, although the term will be considered extended to other rigid structures such as air cavities (frontal or maxillary sinuses).

Throughout the present invention, "3D radiology" means the specialty that deals with generating three-dimensional images of the interior of the human body through different physical agents (X-rays, ultrasound, or magnetic fields, among others), and using these images for the diagnosis and treatment of diseases. More specifically, computerized tomography ("CT") is a radiological modality that allows three-dimensional scans of all body organs by incorporating, into a rotating X-ray tube, a powerful computer that is capable of reconstructing images. The difference with a "conventional radiography" (Rx) is that the latter uses a single X-ray beam, which causes the CT scan to offer more detailed images. In summary, we could say that a CT scan involves the superposition of many radiographs taken from different angles.

From the point of view of the type of operations that we can perform with medical images, and that are directly related to the proposed invention, we should define "segmentation" and "registration". "Segmentation" consists in the delimitation of the edges of an object within an image or, in other words, the partition of an image into disjoint regions based on some criteria (such as gray level, texture or color). On the other hand, "registration" (used to compute the superimposition of two osseous images) refers to the alignment/superimposition of two images, so that they share the same coordinate system. This registration process can be 2D-2D (if the reference image and the moving image, to which the transformations are applied so that the overlap of the common content between the two is maximized, are two-dimensional), 3D-2D (if one of the two images to be registered is three-dimensional), or 3D-3D (if both represent three-dimensional volumes). The result of a registration process between two images is called "superimposition".

Both in segmentation and in registration, and in a generic way in many other problems in computer science, functions are used that allow quantifying the similarities and differences between two objects (in this case, images) of the same dimensionality. Hereinafter these functions will be called "similarity metrics". A concrete example could be the Dice metric (also known as Sorensen-Dice Similarity Coefficient), which generally measures the level of overlap between two 2D silhouettes in a segmentation process. Next, the usefulness of the metrics is specified within the three scenarios contemplated above (2D-2D, 2D-3D, 3D-3D) in the registration framework:

2D-2D scenario: the comparison can be made using the Dice metric or other metrics such as Hausdorff.

2D-3D scenario: the same metrics are used as in the 2D-2D scenario, since the comparison is made between the 2D image and a 2D projection of the 3D image.

In the 3D-3D case there are two possible cases:

Comparison of CTs/MRIs: metrics such as mutual information are used [Pluim, J. P., Maintz, J. A., & Viergever, M. A. (2003). *Mutual-information-based registration of medical images: a survey*. IEEE transactions on medical imaging, 22 (8), 986-1004].

Comparison of the segmentation of a CT/MRI (AM) and a 3D surface model (PM): metrics such as the average distance of each point from one of the 3D models to the closest point of the other 3D model with the given transformation will be used.

"Forensic identification" means any technique that allows establishing the identity of a subject for legal purposes. The term "subject" refers in the present invention to any vertebrate animal and, in particular (and more commonly), to humans. From the point of view of forensic identification based on the comparison of radiographs, the most common casuistry implies, as already indicated, an AM and another PM radiography. The term "ante-mortem" refers, in general, to the osseous image acquired at some time prior to the identification process. In a particular realization, it refers to a moment before the death of the subject. The term "post-mortem" refers, in general, to a moment after the "ante-mortem" moment and, preferably, to the moment at which the identification process begins. In a particular realization, it will refer to a moment after the death of the subject.

"Decision support data" means those data that can be used by the decision-making support system given its discriminatory value: the quality of a superimposition, the quality of the skeletal structures (conservation) and images (resolution, artifacts, etc.) examined, the presence of special/infrequent characteristics considering their frequency, the uncertainties of the process (for instance, segmentation errors), biological profile of the subject, anatomical criteria (skeletal structure morphology, trabecular patterns, conditions pathological and traumatic, etc.), and the sum of multiple evidences of the skeletal structure itself (comparison of more than one AM image, evaluation of more than one anatomical criterion).

"Superimposition criteria" is understood as any methodological principle that allows for the objective evaluation of the quality of a superimposition, such as the morphological comparison between the silhouettes of two RASs. Each criterion is evaluated through the use of one or more similarity metrics.

The term "decision support system" refers to a computerized system that, automatically or semi-automatically, assists the expert in performing a complex high-level task, such as medical diagnosis or forensic identification. In the specific case of forensic anthropology, the tasks in which the system can help an expert range from automatic reporting of similarities and differences between an AM case and a PM case, to filtering cases from the list of candidates, or obtaining the most likely candidate or candidates according to the system.

Finally, the term "hierarchical fuzzy model" or "hierarchical fuzzy analysis model" refers to a model composed of several information aggregation levels, each with a different degree of abstraction, ordered from the simplest to the most complex, where the value of a level depends on the output of the previous one along with new level information. Each level can operate based on a fuzzy logic that allows dealing with the uncertainty of each process, and that can be translated into linguistic labels easily understood by a human being.

Procedure for the Automatic Comparison of Skeletal Structures' Images of the Invention This invention describes a procedure, hereinafter referred to as the "invention procedure", that automates the comparison of two images of the same RAS to determine whether they belong to the same subject.

Particularly, the invention procedure comprises a decision-making stage. This decision-making stage is characterized by the calculation of the degree of confidence for identification using soft computing. The value of the degree of confidante is obtained based on superimposition metrics, as well as any other relevant information about the images, the skeletal structures or the medical history.

Decision-Making Stage

The invention procedure comprises a decision-making stage that provides, by means of a hierarchical decision support system, a fuzzy value of the degree of matching between the AM and PM data. The fuzzy value is within a pre-determined scale (in particular, between 0 and 1).

The hierarchical decision support system comprises, depending on the available data, at least three levels of abstraction:

Level 4 (Criteria): This level analyzes a superimposition under a certain criterion (e.g. morphology) using multiple metrics. Furthermore, the level of reliability of each metric is also considered. Finally, the output of this level is weighted based on the reliability of the analyzed criterion.

Level 3 (Superimposition): This level aggregates all the criteria with which a superimposition can be analyzed (performed at level 4), such as morphological differences between AM and PM information. This level also aggregates all the information related to a superimposition, such as the quality of images employed and the visibility of the skeletal structure.

Level 2 (RAS or skeletal structure): It aggregates all the information of all the superimpositions of a skeletal structure (performed at level 3) as well as the quality of the skeletal structures involved in the superimposition (e.g. state of conservation), the discriminatory potential of each skeletal structure, and the presence of special/non-frequent characteristics.

The aggregation of information at all levels is performed using soft computing techniques and, particularly, aggregation functions [Beliakov G, Pradera A, Calvo T (2007). *Aggregation functions: A guide for practitioners*, volume 221, Springer]. Different aggregation functions are used at each level.

In a preferred implementation, as well as by default, the aggregation functions used would be the following (or combinations thereof):

Levels 2 and 3: weighted arithmetic mean and weighted geometric mean.

Level 4: minimum, product and arithmetic mean.

In an even more preferential implementation, the following aggregation functions are used:

$$\text{result level 4} = \min\left(1, \frac{\sum_{m=1}^{n^2 metrics} \text{result}_m \cdot \text{reliability}_m}{n^2 \text{metrics}} \cdot \left(0.9 + \frac{n^2 \text{metrics}}{10}\right)\right). \quad \text{(Eq. 1)}$$

criteria_reliability $\in [0, 1]$ where $n^2$ metrics is the number of metrics employed to evaluate a given criterion; $\text{result}_m$ is the results of evaluating a given criterion using the metric m; $\text{reliability}_m$ is the reliability of the metric m; and criteria_reliability is the reliability of the evaluated criterion.

$$\text{result level 3} = \min\left(1, \frac{\sum_{m=1}^{n^2 metrics} \text{level 4's result}_m}{n^2 \text{criteria}} \cdot \left(0.9 + \frac{n^2 \text{criteria}}{10}\right)\right) \cdot \text{ImgQuality}_1 \cdot \text{ImgQuality}_2 \quad \text{(Eq. 2)}$$

$\in [0, 1]$ where $n^2$ criteria is the number of criteria utilized to evaluate a superimposition; level 4's $\text{result}_m$ is the result of evaluating the criterion m in the level 4; and ImgQuality is the quality of the images involved in the superimposition process.

$$\text{result level 2} = \min\left(1, \frac{\sum_{m=1}^{n^2 RAS\, images} \text{level 3's result}_m}{n^2 RAS\, \text{images}} \cdot \left(0.9 + \frac{n^2 RAS\, \text{images}}{10}\right)\right) \cdot \text{RAS\_Quality} \cdot \text{RAS\_reliability} \quad \text{(Eq. 3)}$$

$\in [0, 1]$ where $n^2$ RAS images is the number of comparison performed among the image of a RAS; level 3's $\text{result}_m$ is the result of evaluating the superimposition m in the level 3; RAS_Quality represents the state of conservation of the RAS; y RAS_reliability represents the discriminatory power of the RAS.

In the absence of further information, the reliability of each criterion is preferably equal to 1.

However, these default functions should be finetuned for each skeletal structure through a data driven process. Thus, a significant number of cases are required for finetuning each aggregation function. These cases must reflect all casuistries of the real scenario under study. The finetuning process is based on maximizing the percentage of real positives and real negatives, and minimizing the percentage of false positives and false negatives. Furthermore, some functions will be further modified or discarded based on the particularities of each skeletal structure as well as in reliability studies.

In a particular implementation, the invention procedure also combines the information of multiple RASs of the same subject when enough data are available. In these identification scenarios, the hierarchical decision support system comprises a fourth level of abstraction:

Level 1 (Subject): This level aggregates all the information available of the same subject, considering multiple skeletal structures and multiple superimpositions of each of them.

The aggregation function, in a particular implementation, for level 1 is the arithmetic mean or the geometric mean. In a preferred implementation, the aggregation function used is that determined by Eq. 4:

$$\text{result level 1} = \min\left(1, \frac{\sum_{e}^{n^2 RASs} \text{result}_e}{n^2 RASs} \cdot \left(0.9 + \frac{n^2 RASs}{10}\right)\right) \in [0, 1] \quad \text{(Eq. 4)}$$

where $n^2$ RASs □ is the number of skeletal structures available for the comparison; and $\text{result}_e$ is the result of evaluating all the images of the RAS e in the level 2.

Equations 1, 2, 3 and 4 contain a weighting term $$\left(\text{e.g.}\square\square\left(0.9 + \frac{n^2 \text{metrics}}{10}\right)\square\text{in} \right. \quad \text{Eq. 1})$$

to give more importance to those cases where multiple metrics, criteria, RAS images, and multiple RASs, respectively, are utilized. The aim is to give greater reliability to those cases in which more information is employed in the decision-making process.

In a particular implementation, the decision-making system takes into account two sources of information: (1) data automatically calculated by the system; and (2) data provided to the invention system by the forensic experts.

The data provided to the system by the forensic expert in a preferential implementation are the following:

Osseous image quality. This value is provided by the expert to the system. It can take seven values between [0, 1] depending on the state of conservation [J. E. Buikstra, D. H. Ubelaker, *Standards for data collection from human skeletal remains*]: stage 0 will have a value of 1.0, stage 1 of 0.8, stage 2 of 0.6, stage 3 of 0.4, stage2 of 0.2, stage 5 of 0.1, and stage 6 of 0.0.

Presence or absence of special/non-frequent characteristics considering their frequency. These data are composed of a list of binary values, one for each special characteristic that a given RAS may have. These characteristics allow to capture multiple evidences of the SAR, and thus to vary the final reliability of the specific RAS according to its particularities.

In the absence of information, a value of 1 will be assigned to the skeletal structure quality, and the RAS will be considered not to have any unusual characteristic. The data automatically calculated by the system in a preferred realization are as follows:

Image quality, for which one of the methods and metrics presented above can be used, such as those cited in [Deng, Y., Loy, C. C., & Tang, X. (2017). *Image aesthetic assessment: An experimental survey*. IEEE Signal Processing Magazine, 34(4), 80-106]. In a preferred realization, it will be used the image quality measurement/metric described in [Mittal, A., Moorthy, A. K., & Bovik, A. C. (2012). *No-reference image quality assessment in the spatial domain*. IEEE Transactions on Image Processing, 21(12), 4695-4708], which provides a value between [0, 1], and where a reference operating as ground truth and whose quality is considered 'perfect' is not required.

Anatomical criteria. The anatomical criteria considered in a preferred performance are as follows (these are some examples of preferred criteria for evaluating the superimposition at level 4):

Criterion 1: AM-PM morphological comparison by
  RI 3D-2D or 2D-2D—Dice metric. Measures the error of the overlap between the pixels of a RAS in two images (in the 3D case, it would be compared with a projection of it) obtaining a value in the range [0, 1], where 0 indicates no overlap and 1 indicates perfect overlap. By default, in this preferred realization, this metric is inverted by the following formula: 1-Dice.
  RI 3D-2D or 2D-2D—Hausdorff metric. It provides the maximum of the minimum distances between two contours of the same RAS in two images (in the 3D case it would be compared with a projection of it). The Hausdorff metric gives a value between [0, diagonal of the image]. By default, this metric is normalized by the diagonal of the image to a value in the range [0, 1]. In practice, just as the Dice metric measures the amount of overlap between two objects, the Hausdorff metric provides a reference to the proximity of the resulting contours.
  RI 3D-3D (surface)—Hausdorff metric. Provides the maximum of the minimum distances between two meshes of the same RAS in two images. The Hausdorff metric gives a value between [0, the larger diagonal of the bounding box (region of interest) of the two images]. By default, in this preferred implementation, this metric is normalized by the diagonal of the bounding box.

Criterion 2: Comparison of bone density (trabecular patterns, whole-bone density, etc.) by:
  RI 2D (Rx)-2D (Rx)—normalized mutual information metric. The mutual information represents both the amount of information that image A (in this case, an Rx) contains from image B (in this case, another Rx), and the amount of information that B contains from A. To superimpose both images, an attempt is made to maximize this information. The normalized mutual information tries to carry the possible values to a limited range, specifically [0, 1]. The higher the value of the index, the higher the correlation of the images and therefore the better the result of the superimposition process.
  RI 3D (volume)-2D (Rx)—normalized mutual information metric. It works in the same way as above, but in this case, it would be used on the 2D Rx and the 2D projection of the 3D volume.
  RI 3D-3D (volume)—normalized mutual information metric. Its operation is identical to the one described above, but in a three-dimensional space [Pluim, J. P., Maintz, J. A., & Viergever, M. A. (2003). *Mutual-information-based registration of medical images: a survey*. IEEE transactions on medical imaging, 22(8), 986-1004].

Discriminatory power of the subject's RAS. To obtain this, the discriminative power of each RAS is used and modified according to the presence or absence of special/non-frequent characteristics, previously defined in the system and commonly provided by the forensic expert (each one may increase the final discriminatory power of the subject's RAS to a different degree), always obtaining a value within the range [0, 1]. The discriminatory power of each RAS is a fixed value in the range [0, 1] that represents the discriminative power of the RAS in forensic sciences statistical studies.

To obtain the final value in the decision stage, the decision support data added at each level is associated with a weight, or weighting value, previously stored in the system and which can be obtained based on expert human knowledge, statistical studies on the reliability of each data, as well as experimental studies that allow weights to be associated with decision support data, so that accuracy and robustness are maximized. These weights, in a preferred realization, will be established and updated from an automatic learning process based on the data itself (existing studies, available expert information).

In a preferred realization, the decision making system would aggregate all available sources of information to obtain a confidence value for the identification. Such information is aggregated following a hierarchical approach using levels 4, 3 and 2.

In a preferred realization, where we have $J_A$ AM images and $J_P$ PM images of K RASs (K>1) from the same subject, the procedure of the invention combines the information of each RAS to provide a more robust and reliable decision. In this case, a final level (level 1) is added to the model to aggregate the information of all available RAS from the same subject. The hierarchical approach used in this realization is as follows:

Level 1: Several RASs from the same subject.
  1.1: Quality of PM-AM matching of the skeletal structure$_k$ (output of level 2), k=1, . . . , number of skeletal structures.
  1.2: Information regarding the biological profile of the subject to be identified
Level 2: Image(s) corresponding to each RAS.
  2.1: Quality of the matching of the PM image with the AM$_j$ image (level 3 output), with j=1, . . . , number of skeletal structure X-rays.
  2.2: Quality conservation of the RASs (weathering stages).
  2.3: Discriminatory power of each specific anatomical structure. Which is obtained from:
    2.3.1: Discriminatory power of the anatomical structure in statistical studies.
    2.3.2. Presence/absence of infrequent characteristics according to sex, age, ancestry (asymmetries, pathologies, anomalies, etc).

Level 3: For each image we analyze different criteria.
　3.1: Quality of the AM-PM superimposition according to criterioni (output of level 4).
　3.2: AM Image quality (resolution, artifacts, etc.).
　3.3: PM Image quality (resolution, artifacts, etc.).
Level 4: Each criterion can be analyzed in different ways.
　4.1: Result of each metric.
　4.2: Reliability of each metric.
　4.3: Reliability of each criterion.
　4.4: Uncertainty in the application of the criterion (uncertainty/level of occlusion of the segmentation in criterion 1, time difference in the acquisition of AM-PM images in criterion 2)
　Criterion 1: AM-PM morphological comparison by:
　　RI 3D-2D—Dice metric.
　　RI 3D-2D—Hausdorff metric.

In a preferred realization, with the same 3D model of a PM skeletal structure, the algorithm is executed on an AM radiographic database, so that the output of the procedure consists of an ordered list of candidates.

This output is useful to facilitate the final identification, so that the procedure operator himself can provide subjective information to correct possible errors in the automatic identification provided.

Stages Prior to Decision-Making

The process of the invention can be complemented with several stages of data preprocessing that provide information to be aggregated in the hierarchical fuzzy model of the decision-making stage.

The first preliminary stage corresponds to the segmentation and quality enhancement of osseous images, while the second refers to the automatic superimposition of osseous images.

Thus, in a preferred realization, the process of the invention comprises at least one of these steps. In an even more preferred realization, the procedure of the invention comprises both stages. These are described below:

Osseous Images Segmentation and Enhancement Stage

The goal of this stage is to perform the segmentation of the osseous images that one wants to compare, saving time and money to human operators, as well as reducing the errors related to the human expert's fatigue (because it is a slow, tedious and repetitive operation). The method of the invention could take previously manually segmented images as input, but this invention already includes a method for the automatic segmentation of osseous images. In the case at hand, the segmentation of osseous images involves segmenting the silhouette of the RAS, in the case of a 2D image, or segmenting the volume of the RAS, in the case of 3D images such as CTs, or filtering the 3D scan so that the only mesh is the one relative to the RAS that one wants to compare. This segmentation process also includes the segmentation of the occlusion or uncertainty region, that is, the segmentation of the area where the expert has doubts about the presence or absence of the RAS.

Segmentation can be done manually (through the tedious, slow and error-prone human intervention), semi-automatic (through direct human intervention or supervision in any of the phases of the segmentation algorithm), or even automatic (when the intervention of the human operator to obtain the segmentation result is non-existent, see as an example [Ronneberger O, Fischer P, Brox T (2015). *U-net: Convolutional networks for biomedical image segmentation*. In International Conference on Medical image computing and computer-assisted intervention, 234-241]).

In a preferred realization, segmentation is performed by using a deep neural network comprising the following steps:

1. Collection of a set of osseous images together with their correct segmentation (what is known as ground truth) of the RAS to be segmented. This set is known as training set and, from it, the network will learn how to segment osseous images by itself.
2. Network training for one or several particular osseous structures using the backpropagation algorithm [LeCun Y, Bottou L, Bengio Y, Haffner P (1998). *Gradient-based learning applied to document recognition*. Proceedings of the IEEE, 86 (11), pp. 2278-2324].
3. At this point, we would have a trained neural network to automatically segment certain RASs within an osseous image (for example, the clavicle, patella, or frontal sinuses). Therefore, the segmentation method could be validated on images other than those seen during training, and used in real cases.

Unlike classical segmentation approaches, this particular realization of the segmentation stage, based on deep neural networks, allows us to automatically identify complex patterns directly from data (and without any human supervision, apart from the manually segmented set of training images).

Automatic Superimposition of Osseous Images Stage

The goal of this stage is to look for the best possible superimposition between the two osseous images that you want to compare. For this, an image registration problem is solved and the result will be a transformation that converts one of the two images so that it is as similar as possible to the other. Specifically, in the case of 2D-3D in CR, it would be a projection of the 3D PM model as similar as possible to the AM image. Then, you can compare the static image (or reference; which in the case 2D-3D, is always 2D) and transform it to obtain different "quality" measures through similarity metrics. At this stage, one or several (already existing or original) mathematical formulations can be used to model the transformation between the two osseous images and, in particular, the projection of the geometry of a 3D image onto a 2D image. The registration algorithm uses an objective function that measures the distance between two osseous images based on a similarity metric. This function is optimized, preferably, by stochastic optimization algorithms based on metaheuristics (for example, differential evolution [Storn R, Price K (1997) Differential evolution—a simple and efficient heuristic for global optimization over continuous spaces, Journal of Global Optimization 11 (4), 341-359]) because it corresponds to a computationally complex and multimodal optimization problem that has not been satisfactorily solved yet by deterministic or gradient-based optimization methods.

In a preferred realization, the superimposition is searched using the method described in Gómez O, Ibanez O, Valsecchi A, Cordón O, Kahana T (2018). 3*D-2D Silhouette-based Image Registration for Comparative Radiography-based Forensic Identification*. Pattern Recognition Volume 83, November 2018, Pages 469-480]. This method employs a stochastic optimizer to find the best 2D projection of the surface model, so that differences with the 2D segmentation of the RAS are minimized.

Applications of the Procedure of the Invention

In a particular realization, the method of the invention is used to compare osseous images taken ante-mortem with osseous images taken post-mortem, and to provide useful information for decision making in forensic identification.

Implementation of the Procedure of the Invention

In addition, the computer programs, comprising instructions for making a computer carry out the process of the invention, are also object of the invention.

The invention encompasses computer programs that may be in the form of source code, object code or intermediate code between source code and object code, such as partially compiled form, or in any other compilation form suitable for use in the implementation of the processes according to the invention. In particular, computer programs also encompass cloud applications that implement the method of the invention.

These programs may be arranged on, or within, a support suitable for reading, hereinafter, "carrier medium" or "carrier". The carrier medium can be any entity or device capable of carrying the program. When the program is incorporated into a signal that can be directly transported by a cable or other device or medium, the carrier means may be constituted by the aforementioned cable or other device or medium. As a variant, the carrier means could be an integrated circuit in which the program is included, the integrated circuit being adapted to execute, or to be used in the execution of, the corresponding processes.

As example, the programs could be incorporated into a storage medium, such as a ROM, a CD ROM or a semiconductor ROM, a USB memory, or a magnetic recording medium, for example, a floppy disk or a hard drive Alternatively, the programs could be supported on a transmissible carrier signal. For example, it could be an electrical or optical signal that could be transported through an electrical or optical cable, by radio or by any other means.

In this sense, another object of the invention is a storage medium readable by a computer comprising program instructions capable of causing a computer to carry out the process of the invention.

Finally, another object of the invention relates to a transmissible signal comprising program instructions capable of causing a computer to carry out the process of the invention.

System of the Invention

In other aspect, the invention has as its objective a system, hereinafter "system of the invention", comprising means for carrying out the process of the invention.

More specifically, the system of the invention comprises:
Means to capture or acquire images.
Information processing means suitable for executing instructions that allow carrying out the process of the invention.

The means for capturing or acquiring images refer to all the systems that allow to obtain osseous images such as X-ray generators, CTs, MRIs, structured light scanners, photogrammetry systems, etc.

As information processing medium, any equipment with a processor capable of executing the program instructions that implements the method of the invention can be used. In a preferred realization, the processing medium will be a server with a high computing capacity that the user accesses as a web service, and that will allow him/her to perform the procedure of the invention without the need for specific hardware or software, thus facilitating the accessibility to the invention.

Realization of the Invention

Next, a specific realization of the proposed invention is presented, particularized to the forensic identification scenario of comparing 3D and 2D osseous images of RASs. Specifically, RAS radiographs will be used as an AM osseous image, and CT scans, or 3D surface models, such as PM osseous image. The procedure of this realization consists in comparing a PM case, composed of a single 3D image of each of the RAS, present in the PM remains of the subject and that are in a good state of preservation, against a list of different candidates (i.e., AM cases) each with one or several osseous images of one or more RASs (note that the lists of AM and PM RASs do not have to be the same), in order to obtain an ordered list of AM cases depending on the probability that they belong to the subject of the PM case. In an ideal case, the positive case (when comparing an AM and PM case belonging to the same subject) will be placed in the first position of the list.

Figure 1:
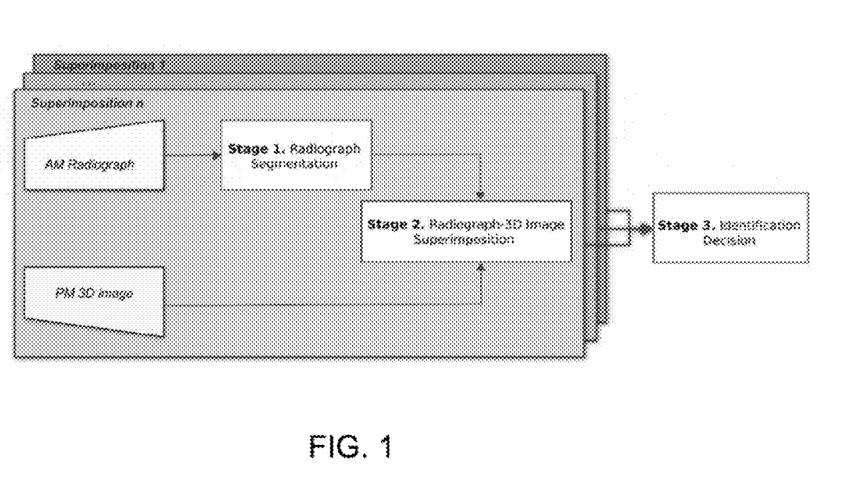

The procedure to obtain the probability that an AM and PM case belong to the same subject is done by comparing all their common RASs. First, the superposition of each of the PM RASs is performed against all the AM images of the same RAS by using the two preprocessing steps described above. Next, all superimpositions are compared by the decision-making stage (FIG. 1). It is important to note that stage 3 comprises 4 levels.

The preferred realization of the three stages is as follows:

Stage 1. Osseous Images Segmentation and Enhancement

At this stage several automatic procedures are distinguished depending on the image modality to be segmented.
  The segmentation of AM radiographs will be performed using procedure 1.1 (described below).
  The segmentation of PM surface models will be carried out using procedure 1.2 (described below).
  The segmentation of PM CTs will be done by procedure 1.3 (described below).

Procedure 1.1. X-Ray Images Segmentation

Figure 2:
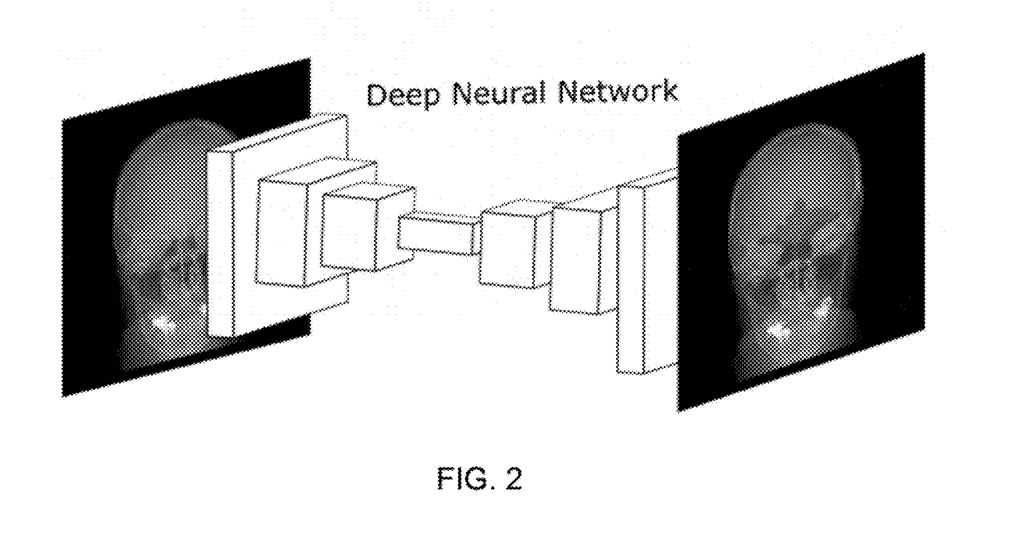
Figure 3:
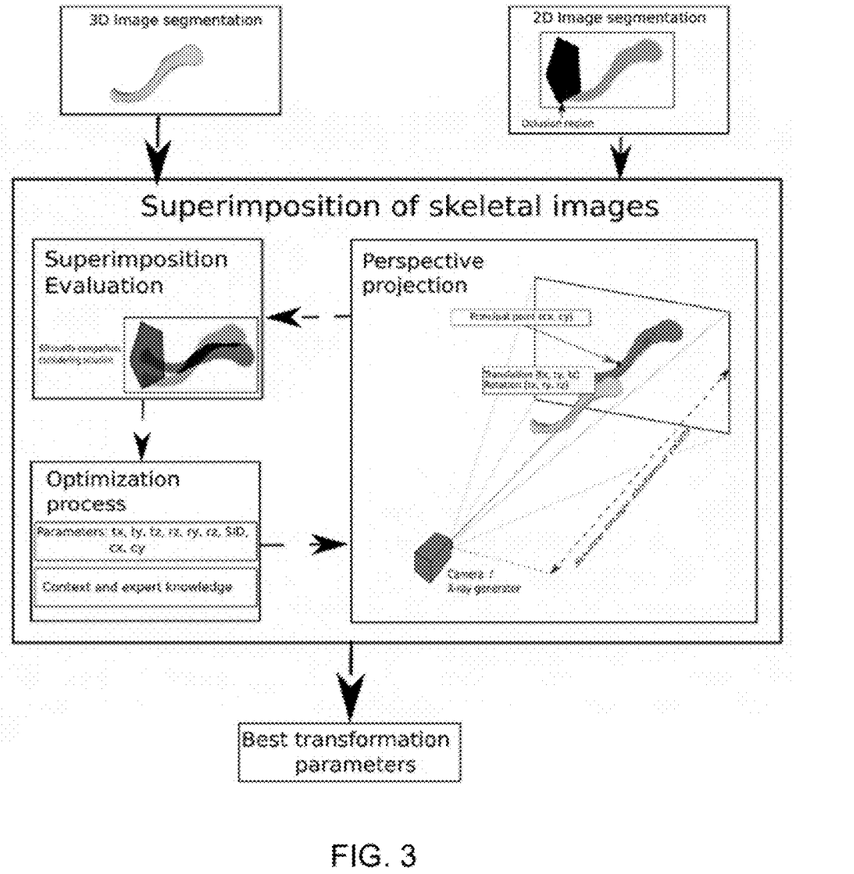
FIG. 3.—Overview of the superimposition algorithm of 2D and 3D osseous images. In this preferred implementation, the input of the algorithm is composed of the RAS segmentation in the AM 2D image and the RAS segmentation in the PM 3D image. The best superimposition is searched via an iterative optimization process that tries to minimize the differences between the silhouette of the 2D RAS image and the silhouette of a 2D projection of the 3D RAS image.

In radiographs it is necessary to segment two regions or structures: the silhouette of the RAS and the occlusion region (the doubtful area, where it is not possible to determine with total certainty whether the RAS is present or not). This procedure is performed automatically by using a deep neural network. This network, as shown in FIG. 2, receives an X-ray image as input and provides the probability of each pixel of the image to belong or not to the RAS as output. These probabilities are thresholded and discretized so that the osseous image is segmented into three categories: background, occlusion zone and RAS silhouette.

The network used is inspired by InvertedNet [Novikov, A. A., Lenis, D., Major, D., Hladovka, J., Wimmer, M., & Buhler, K. (2018). *Fully convolutional architectures for multi-class segmentation in chest radiographs*. IEEE Transactions on Medical Imaging] which, in turn, is based on U-Net [Ronneberger O, Fischer P, Brox T (2015). *U-net: Convolutional networks for biomedical image segmentation*. In International Conference on Medical image computing and computer-assisted intervention, 234-241]. From now on the deep neural network used for segmentation will be referred to as RASSegNet. In relation to InvertedNet, RASSegNet introduces the following changes that lead to a significant improvement in the results:

The introduction of a special type of convolution, called atrous convolution, in the center of the network [Chen, L. C., Papandreou, G., Schroff, F., & Adam, H. (2017). *Rethinking atrous convolution for semantic image segmentation*. arXiv preprint arXiv: 1706.05587]. Specifically, the RASSegNet center consists of five layers with atrous convolution with the following dilation rates: 1 (equivalent to a normal convolutional layer), 2, 4, 8 and 16.
  The use of batch normalization [Ioffe S and Szegedy C. (2015) *Batch normalization: Accelerating deep network training by reducing internal covariate shift*, International Conference on Machine Learning, 448-456] in all convolutional layers.
  The use of a final layer of Conditional Random Fields (CRF) [Zheng S, Jayasumana S, Romera-Paredes B, Vineet V, Su Z, Du D, Huang C, Torr P H S (2015).

*Conditional random fields as recurrent neural networks*. IEEE International Conference on Computer Vision, 1529-1537].

The network has been simplified to be able to work with images of greater dimensionality, since the state-of-the-art methods are restricted to using images smaller than or equal to 256×256 pixels or, if using larger sizes, employ multi-GPU solutions that require expensive and complex hardware modifications. In our case, the simplification of the network has been carried out by:

Reduction of the number of filters per convolutional layer in half.

The elimination of the first two convolutional layers at the beginning of the architecture due to the significant amount of memory required by their activation maps.

Related to this last point, the procedure to segment radiographs of a dimension greater than 256×256 is as follows:
1) Train the RASSegNet network (without the final CRF layer) with 256×256 images (if they originally had a different size, they would be resized to 256×256).
2) Extend RASSegNet to the target dimension (say 1024×1024) by adding, before the beginning of the network, the max pooling layers necessary to reach the dimensionality of 256×256 and, at the end of the network, the up-sampling and convolutional layers connected with the outputs of the max pooling from the beginning until reaching the original dimensionality.
3) Train the new network by initializing its "core" (represented by the network with the weights obtained in step 1).
4) Add the final CRF layer and retrain the network from the weights obtained in step 3.

The segmentation of each type of RAS will be performed, either with a network specifically trained for its segmentation (that is, there would be as many networks as types of RASs), or with a multitasking network that segments several RASs simultaneously. The training of the network of each RAS will not be done from scratch but will be based on the weights of another network of a similar RAS and, if possible, using the Dice metric as a loss function.

The use of the network, once trained, is immediate, which allows to obtain the segmentation in less than a second. The segmentation obtained is slightly refined through the elimination of artifacts and the use of deformable models [Mesejo P, Ibanez O, Cordón O, Cagnoni S (2016). *A survey on image segmentation using metaheuristic-based deformable models: state of the art and critical analysis*. Applied Soft Computing, 44, 1-29].

Procedure 1.2. Improvement of Surface Scans

This process involves the cleaning of artifacts present in the surface model, as well as the simplification of the 3D PM model if necessary.

In this preferred realization, the simplification is made using the Meshlab's Quadric Edge Collapse Decimation algorithm [Cignoni, P., Callieri, M., Corsini, M., Dellepiane, M., Ganovelli, F., Ranzuglia, G. (2008) *Meshlab: an open-source mesh processing tool*. In: Sixth Eurographics Italian Chapter Conference, pp. 129-136].

Procedure 1.3. CTs Segmentation

The automatic segmentation of CTs is done using the RASSegNet architecture to segment the entire volume of a RAS in an integral manner (similar to the way V-Net [Milletari, F., Navab, N., & Ahmadi, SA (2016). *V-net: Fully convolutional neural networks for volumetric medical image segmentation*. 2016 Fourth International Conference on 3D Vision (3DV), pp. 565-571] uses U-Net for MRI segmentation). As in procedure 1.1. a specific network has to be trained for the segmentation of each type of RAS.

Stage 2. Automatic Superimposition of Osseous Images

The preferred realization of the 3D-2D image registration stage is very close to [Gómez O, Ibanez O, Valsecchi A, Cordón O, Kahana T (2018). *3D-2D Silhouette-based Image Registration for Comparative Radiography-based Forensic Identification*. Pattern Recognition Volume 83, November 2018, Pages 469-480] in the sense that a stochastic optimizer is used to find the best 2D projection of the surface model, so as to minimize differences with the 2D segmentation of the RAS. However, this preferred realization has several significant differences that improve the method with respect to the aforementioned reference:

The modeled transformation is a perspective projection that also considers movements of the principal point. In total, it has 9 parameters: 3 translations, 3 rotations, 1 SID (source image distance), and 2 movements of the principal point. The movement of the principal point allows modeling radiographic protocols where the beam that joins the transmitter and the center of the receiver is not perpendicular (e.g., X-rays taken from Waters' view).

Use of a new metaheuristic winner of several expensive optimization competitions called MVMO-PHM [Rueda J L, Erlich I (2016). *Solving the CEC2016 Real-Parameter Single Objective Optimization Problems through MVMO-PHM* (Technical Report)]. By expensive optimization we refer to those problems where the evaluation of a possible solution to the optimization problem requires many resources, in terms of time and/or memory.

Use of a similarity metric based on the combination and weighting of the Dice and Hausdorff metrics without taking into account the information within the occlusion areas. This allows not only to optimize the overlapping of the silhouettes but also the precision of the contours.

Stage 3. Decision-Making

For the decision support system, the same explanatory framework is taken as the one presented in the detailed explanation of the invention, and is specified for the 2D-3D forensic scenario. Step 3 comprises the 4 levels of abstraction presented in the description of the invention. More specifically, the hierarchical model of the last preferred realization presented in such description will be considered.

Example of Utilization of the Invention

Figure 4:
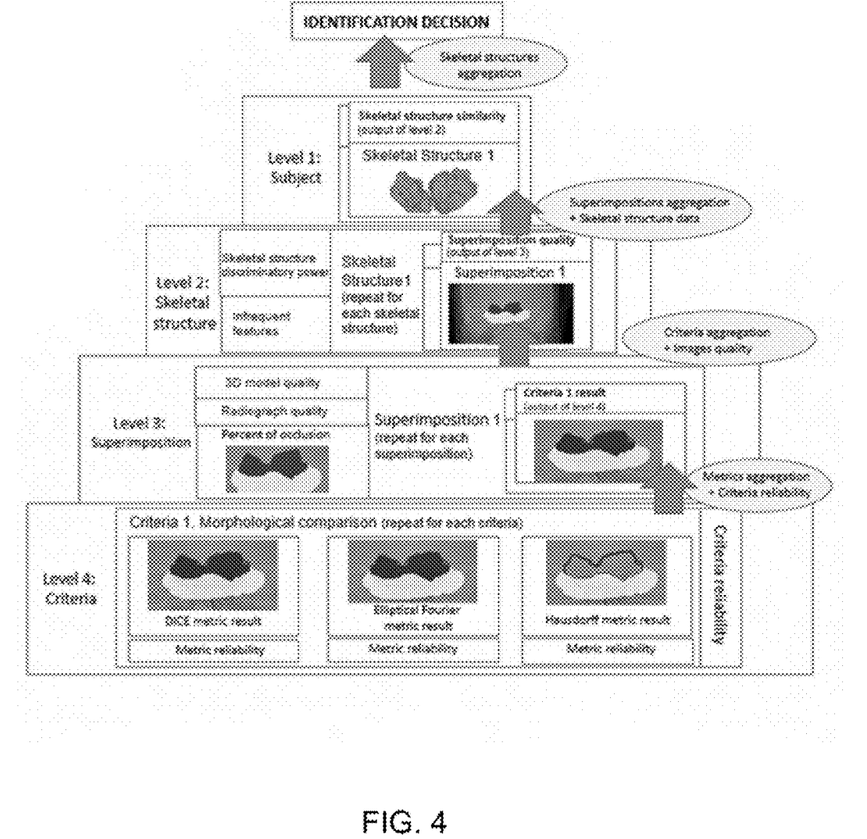
FIG. 4.—Overview of the 4-level hierarchical decision support system (criteria, superimposition, RAS, and multiple RASs) for forensic human identification in the 2D-3D scenario. In this particular realization, the input is one or more superimpositions of one or more RASs, and the output is the degree of confidence about the fact that the AM and PM data belong, or do not belong, to the same subject.

Next, we will show an example of application of this preferred realization of the invention for a specific identification case to verify if the AM and PM data belong to the same subject. In this example we have three RASs: one skull and two clavicles (left and right), these last two RASs being present in the same osseous image, both AM and PM (see FIG. 4).

Thus, the available AM and PM data are as follows:
X-ray AM image of the skull (AM1).
PM CT of the skull (PM1).
Chest X-ray AM image (AM2).
PM CT of the chest (PM2).

Figure 5:
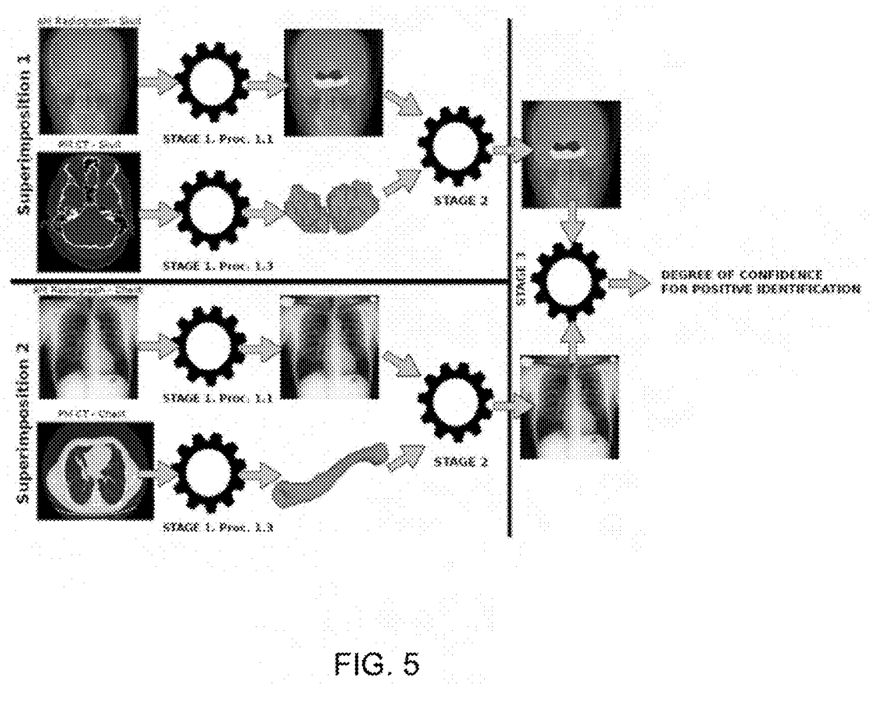
FIG. 5.—Flowchart of an example of use of the invention for 2D-3D forensic identification with three stages. The input is composed of AM radiographs (2D) and PM CTs (3D) of different RAS and, through the invention procedure, the degree of confidence for exclusion or positive identification is obtained.
Figure 6:
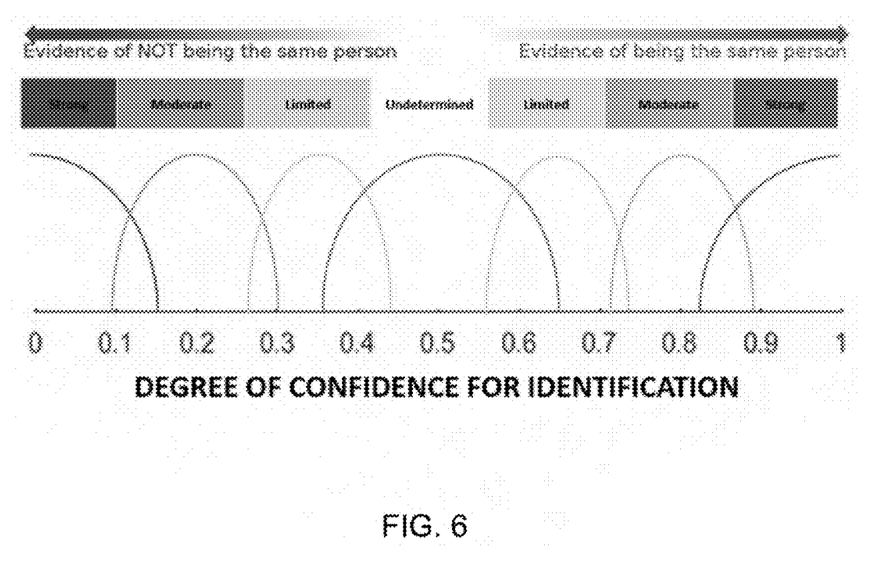
FIG. 6.—Degree of confidence in the identification using membership functions over the result of aggregating all the available information. The degree of confidence measures the probability of the AM and PM RAS images belonging to the same person.

In this specific case it is necessary to perform three superimpositions: one for the RAS of frontal sinuses comparing AM1 and PM1; and one for each clavicle comparing AM2 and PM2. For this, it is first necessary to perform the segmentation of the RASs into the four images (AM1, PM1, AM2 and PM2) by step 1 of the present invention. Second, the superimposition of AM1 and PM1 (frontal sinuses), that of AM2 and PM2 (left clavicle), and that of AM2 and PM2 (right clavicle) are performed by stage 2. Finally, the superimpositions are evaluated by stage 3 and the degree of confidence for a positive identification is obtained (see FIG. 5). This degree of confidence is a fuzzy (diffuse) value that is interpreted in the manner shown in FIG. 6.

Specifically, the calculations made in stage 3 with the superimpositions obtained from stage 2 are as follows:

Level 4. The calculation of the value of the different metrics is performed. These metrics allow measuring the quality of the morphological comparison criterion (first and only criterion used in this example). The metrics used are the following: Dice and Hausdorff distance. The reliability of these metrics is 0.85 and 0.9, respectively. All metrics have been adapted to obtain a value in the range [0, 1] (Dice metric does not need any adaptation; and the Hausdorff distance is normalized by the diagonal of the bounding box of the silhouette), and its representation is changed so that the best value is 1 and the worst is 0. These metrics are added using the aggregator of equation 1, this equation provides a value for each morphological criterion of all superimpositions.

$$\text{result level 4} = \min\left(1, \frac{\sum_{m=1}^{n^2 metrics} \text{result}_m \cdot \text{reliability}_m}{n^2 \text{metrics}} \cdot \left(0.9 + \frac{n^2 \text{metrics}}{10}\right)\right). \quad \text{(Eq. 1)}$$

$$\text{criteria\_reliability} \in [0, 1]$$

Next, the calculations performed at this level with the two superimpositions of this example can be seen:
  Metrics aggregation for the morphological criterion of superimposition 1 for frontal sinus by means of equation 1: (((0.92*0.85+0.9*0.9)/2)*(0.9+2/10)*1=0.87.
    Dice metric result: 0.92.
    Hausdorff metric result: 0.90.
    Morphological criterion reliability: 1.
  Metrics aggregation for the morphological criterion of superimposition 1 for left clavicle by means of equation 1: (((0.95*0.85+0.89*0.9)/2)*(0.9+2/10)*1=0.88.
    Dice metric result: 0.95.
    Hausdorff metric result: 0.89.
    Morphological criterion reliability: 1.
  Metrics aggregation for the morphological criterion of superimposition 1 for right clavicle by means of equation 1: (((0.94*0.85+0.87*0.9)/2)*(0.9+2/10)=0.87.
    Dice metric result: 0.94.
    Hausdorff metric result: 0.87.

Level 3. The aggregation of all the criteria of the same superimposition is done. In this example, multiple criteria are not used, this level is still necessary to add the information related to the quality of the images. This calculation can be done using equation 2.

$$\text{result level 3} = \min\left(1, \frac{\sum_{m=1}^{n^2 metrics} \text{level 4's result}_m}{n^2 \text{criteria}} \cdot \right. \quad \text{(Eq. 2)}$$

$$\left. \left(0.9 + \frac{n^2 \text{criteria}}{10}\right)\right) \cdot \text{ImgQuality}_1 \cdot \text{ImgQuality}_2 \in [0, 1]$$

Next, the calculations performed at this level with the two superimpositions of this example can be seen:
  Criteria aggregation by means of equation 2 for superimposition 1 of frontal sinuses: =(0.87/1)*1*1*1=0.87.
    result_level_4$_1$=0.87
    ImgQuality$_1$=1
    ImgQualityZ=1
  Criteria aggregation by means of equation 2 for superimposition 1 of left clavicle: =(0.88/1)*1*1*1=0.88.
    result_level_4$_1$=0.88
    ImgQuality$_1$=1
    ImgQuality$_2$=1
  Criteria aggregation by means of equation 2 for superimposition 1 of left clavicle: =(0.87/1)*1*1*1=0.87.
    result_level_4$_1$=0.87
    ImgQuality$_1$=1
    ImgQuality$_2$=1

Level 2. The aggregation of all superimpositions for one RAS is performed. In this example no multiple superimpositions are employed, therefore this level is no necessary. This calculation can be made using equation 3.

$$\text{result level 2} = \min\left(1, \frac{\sum_{m=1}^{n^2 RAS\ images} \text{level 3's result}_m}{n^2 RAS\ \text{images}} \cdot \right. \quad \text{(Eq. 3)}$$

$$\left. \left(0.9 + \frac{n^2 RAS\ \text{images}}{10}\right)\right) \cdot \text{RAS\_Quality} \cdot \text{RAS\_reliability} \in [0, 1]$$

Next, the calculations performed at this level with the two superimpositions of this example can be seen:
  Criteria aggregation by means of equation 3 for superimposition 1 of frontal sinuses: =(0.87/1)*1*1*0.9=0.78.
    result_level_3$_1$=0.87
    RAS_Quality=1
    RAS_Reliability=0.90
  Criteria aggregation by means of 3 for superimposition 1 of left clavicle: =(0.88/1)*1*1*0.85=0.74.
    result_level_3$_1$=0.88
    RAS_Quality=1
    RAS_Reliability=0.85
  Criteria aggregation by means of equation 3 for superimposition 1 of right clavicle: =(0.87/1)*1*1*0.85=0.73.
    result_level_3$_1$=0.87
    RAS_quality=1
    RAS_Reliability=0.85

Level 1. The aggregation of all RASs is performed by weighted arithmetic mean. The weights of each RAS are obtained from statistical studies about the identifying power of each RAS, together with the presence or absence of infrequent characteristics. In this example, they are not considered uncommon characteristics, so the only factor that will influence the weights is statistical studies. This calculation can be done using equation 4.

$$\text{result level 1} = \min\left(1, \frac{\sum_e^{n^2 RASs} \text{result}_e}{n^2 RASs} \cdot \left(0.9 + \frac{n^2 RASs}{10}\right)\right) \in [0, 1] \quad \text{(Ec. 4)}$$

Continuing with the example, the calculations corresponding to this level are as follow:
Result of level 1: ((0.81+0.78+0.73)/3)*(0.9+3/10)= 0.92
  RAS 1: frontal sinus.
    Result RAS: 0.78.
  RAS 2: Left clavicle.
    Result RAS: 0.74.
  RAS 3: Right clavicle.
    Result RAS: 0.73.
Obtaining a strong reliability (see FIG. 6) that AM and PM data correspond to the same person.

The invention claimed is:

1. A computer-implemented method of automatic forensic identification based on information of two or more osseous images, said method comprising:
   providing a forensic identification system program accessible on a computing device;
   inputting a plurality of osseous images into said system program;
   a first stage of segmentation by program means executed on said computing device, the first stage comprising the delimitation of the edges of one or more rigid anatomical structures (RAS) within a plurality of previously acquired osseous images;
   a second stage of registration where the program means compute the superimposition of one or more pairs of said osseous images in reference to the alignment of the previously delimited edges, so that each image in each said pair of said osseous images will share the same coordinate system;
   a final stage, where the aforementioned means aggregate the information related to the superimposition of said one or more pairs of said osseous images, and provide a value between 0 and 1 that reflects the quality of osseous image matching by means of a hierarchical fuzzy analysis model.

2. The method according to claim 1, wherein the hierarchical fuzzy analysis model employs four hierarchical levels: a level 1, a level 2, a level 3, and a level 4, each of which adds information associated with comparison between osseous images.

3. The method according to claim 1, wherein each level of the hierarchical fuzzy analysis model comprises one or more weights calculated based on human expert knowledge, statistical studies on the reliability of each datum, or experimental studies that allow weights to be associated with data to support the decision, so that the quality of the decisions taken is maximized.

4. The method according to claim 1, wherein each level of the hierarchical fuzzy analysis model comprises one or more weights calculated through machine learning techniques.

5. The method according to claim 2, wherein said level 4 uses an AM-PM morphological comparison criteria evaluated by means of similarity metrics as decision support data.

6. The method according to claim 2, wherein said level 4 uses an AM-PM morphological comparison criterion evaluated by means of Dice or Hausdorff metrics as decision support data, both using 2D-3D and 2D-2D image recording.

7. The method according to claim 2, wherein said level 4 uses an AM-PM morphological comparison criteria evaluated by means of Hausdorff metrics or 3D-form descriptors as decision support data, using 3D-3D image recording.

8. The method according to claim 2, wherein said level 4 uses a criterion for comparing bone density as similarity metrics as decision support data.

9. The method according to claim 2, wherein said level 4 uses, as decision support data, bone density criteria evaluated by means of mutual information metrics based on the registration of 2D-2D, 2D-3D, and 3D-3D.

10. The method according to claim 2, wherein said level 4 uses, as decision support data, one selected from the group consisting of: reliability of each metric, reliability of each criterion, uncertainty in the application of each criterion, AM-PM acquisition temporal difference, and combinations thereof.

11. The method according to claim 2, wherein said level 4 uses morphological comparison criteria and bone density comparison criteria by means of similarity metrics as decision support data.

12. The method according to claim 11, wherein said similarity metrics are selected from the group consisting of: Dice metrics using 2D-3D and 2D-2D image recording as decision support data, Hausdorff metrics using 2D-3D and 2D-2D image recording as decision support data, Hausdorff metrics using 3D-3D image recording, 3D-form descriptors using 3D-3D image recording, bone density criteria evaluated by means of mutual information metrics based on registration of 2D-2D, 2D-3D, and 3D-3D, and combinations thereof.

13. The method according to claim 2, wherein said level 3 uses, as decision support data, one selected from the group consisting of: quality of the overlapping, evaluated by said level 4, the quality of the osseous images used, or combinations thereof.

14. The method according to claim 2, wherein said level 2 uses, as decision support data, one selected from the group consisting of: quality of the superimpositions, evaluated by said level 3, statistical studies on discriminatory power, the conservation status of one or more RAS present in said one or more pairs of said osseous images, a presence of uncommon characteristics, an absence of uncommon characteristics, and combinations thereof.

15. The method according to claim 2 wherein said level 1 aggregates information relating to all available RASs belonging to one subject.

16. The method according to claim 15, wherein said level 1 uses, as decision support data, one selected from the group consisting of: quality of pairing/matching of all osseous images of each RAS, evaluated by means of said level 2, information related to a biological profile of the subject, and combination thereof.

17. The method according to claim 1, wherein the first stage of segmentation step is performed by means of a deep neural network.

18. The method according to claim 1, wherein the second stage comprises using a stochastic optimizer to perform said superimposition by searching for a best 2D projection of a surface model of said one or more pairs of said osseous images, so as to minimize differences with 2D segmentation of the RAS.

19. The method according to claim 1, wherein:
   said one or more pairs of said osseous images comprises a first set and a second set;
   said first set comprises ante-mortem osseous images;
   said second set comprises post-mortem osseous images; and the provided value between 0 and 1 is used for decision making in forensic identification.

* * * * *

UNITED STATES PATENT AND TRADEMARK OFFICE
CERTIFICATE OF CORRECTION

| | |
|---|---|
| PATENT NO. | : 12,046,018 B2 |
| APPLICATION NO. | : 17/418878 |
| DATED | : July 23, 2024 |
| INVENTOR(S) | : Gomez Lopez et al. |

It is certified that error appears in the above-identified patent and that said Letters Patent is hereby corrected as shown below:

In the Specification

In Column 9, Line 45, delete " $\cdot \epsilon$ " and insert -- $\epsilon$ --, therefor.

In Column 13, Line 3, delete "criterioni" and insert -- $criterion_i$ --, therefor.

In Column 20, Line 13, delete "ImgQualityZ" and insert -- $ImgQuality_2$ --, therefor.

In Column 20, Line 31, delete "level 3's $result_m$" and insert -- *result_level_3$_m$* --, therefor.

Signed and Sealed this
Twenty-ninth Day of October, 2024

*Katherine Kelly Vidal*

Katherine Kelly Vidal
*Director of the United States Patent and Trademark Office*